Feb. 9, 1932.　　　W. D. CROSBY　　　1,844,745
ICE CREAM FREEZER
Filed Aug. 13, 1929　　3 Sheets-Sheet 1

INVENTOR
W. D. Crosby
BY
ATTORNEYS

Feb. 9, 1932.  W. D. CROSBY  1,844,745
ICE CREAM FREEZER
Filed Aug. 13, 1929   3 Sheets-Sheet 2
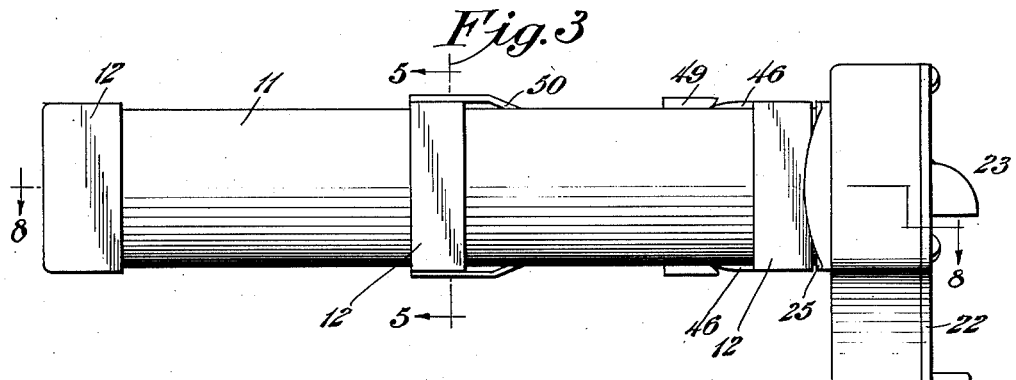
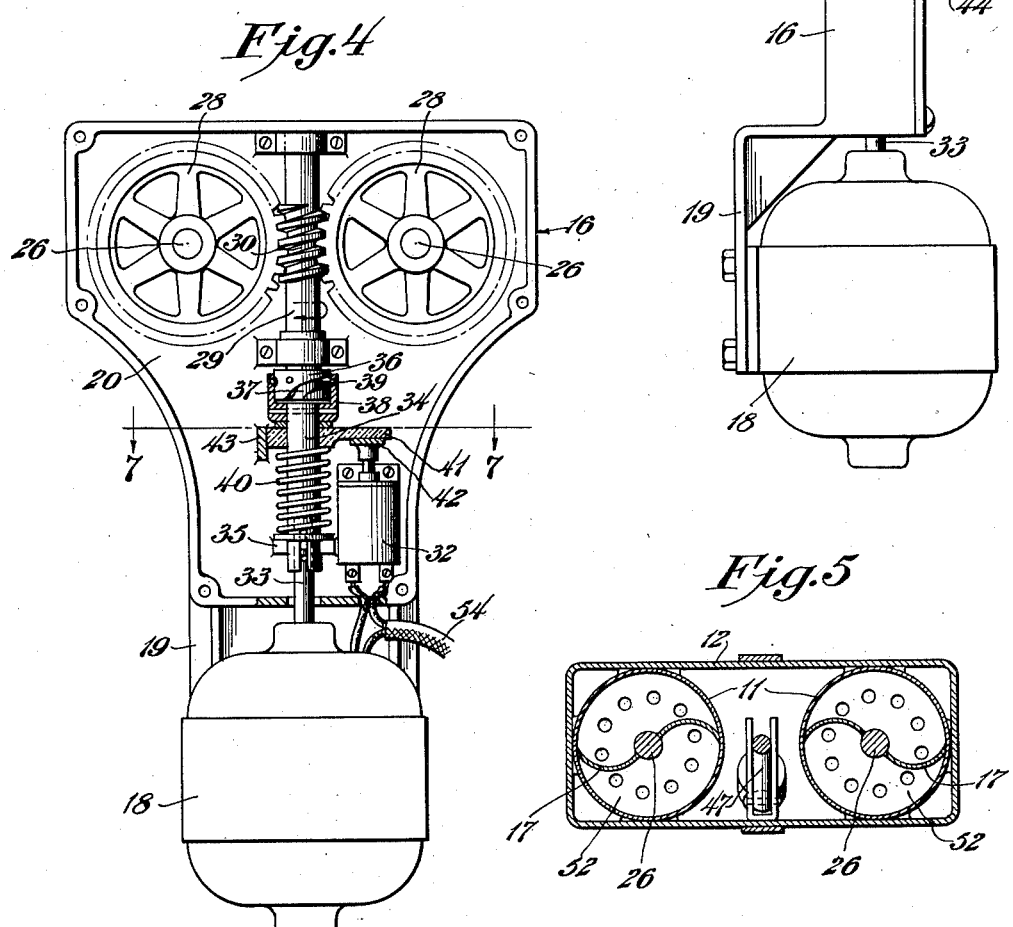
INVENTOR
W. D. Crosby
BY
ATTORNEYS

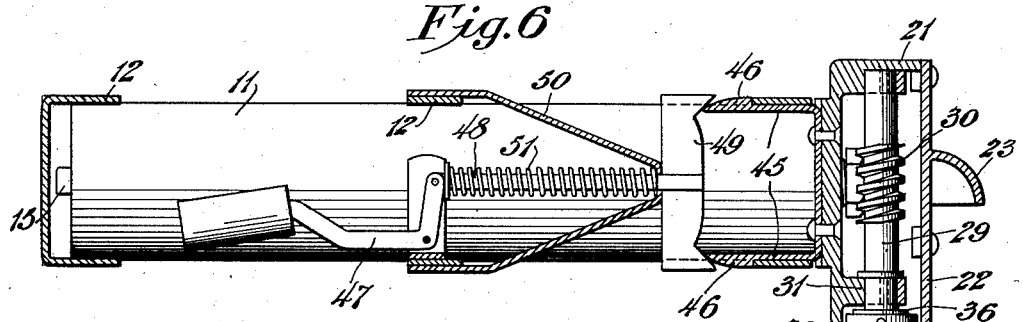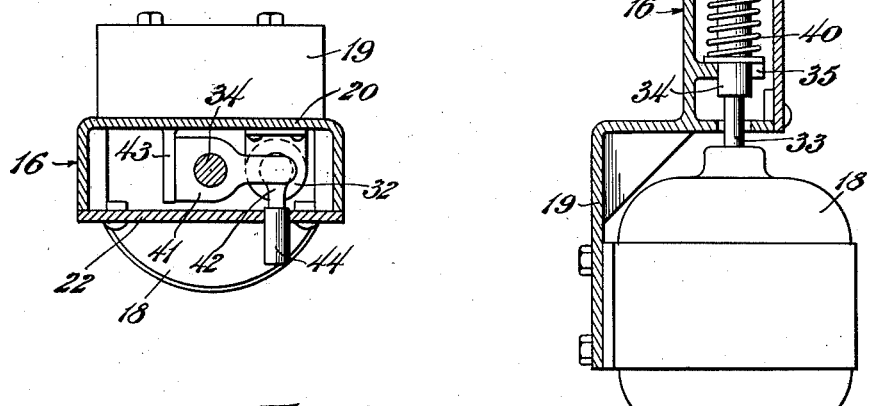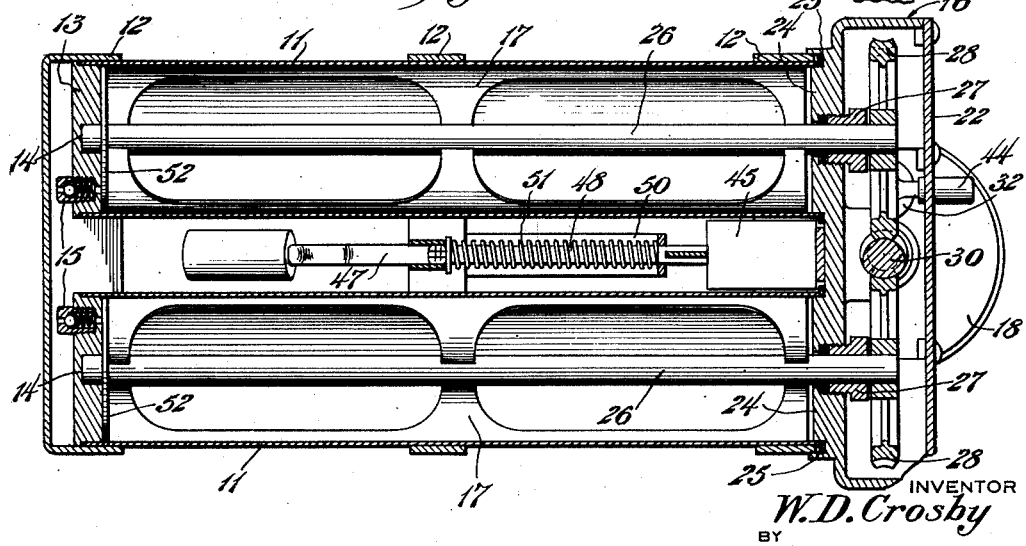

Patented Feb. 9, 1932

1,844,745

UNITED STATES PATENT OFFICE

WILBUR D. CROSBY, OF LIVINGSTON, CALIFORNIA

ICE CREAM FREEZER

Application filed August 13, 1929. Serial No. 385,547.

This invention relates to ice cream freezers and, among other objects, aims to provide a compact, automatic, and simple freezer adapted to be used in electric household refrigerators for freezing small quantities of cream.

Other aims and advantages of the invention will appear in the specification, considered in connection with an illustrative embodiment thereof shown in the accompanying drawings, wherein:

Fig. 3 is a side elevation of the freezer;

Fig. 4 is a front elevation with the front cover of the head removed; parts being shown in section;

Fig. 5 is a section taken on the line 5—5 of Fig. 3;

Fig. 6 is a central longitudinal sectional view;

Fig. 7 is a section taken on the line 7—7 of Fig. 4; and

Fig. 8 is a section taken on the line 8—8 of Fig. 3.

Figure 1:
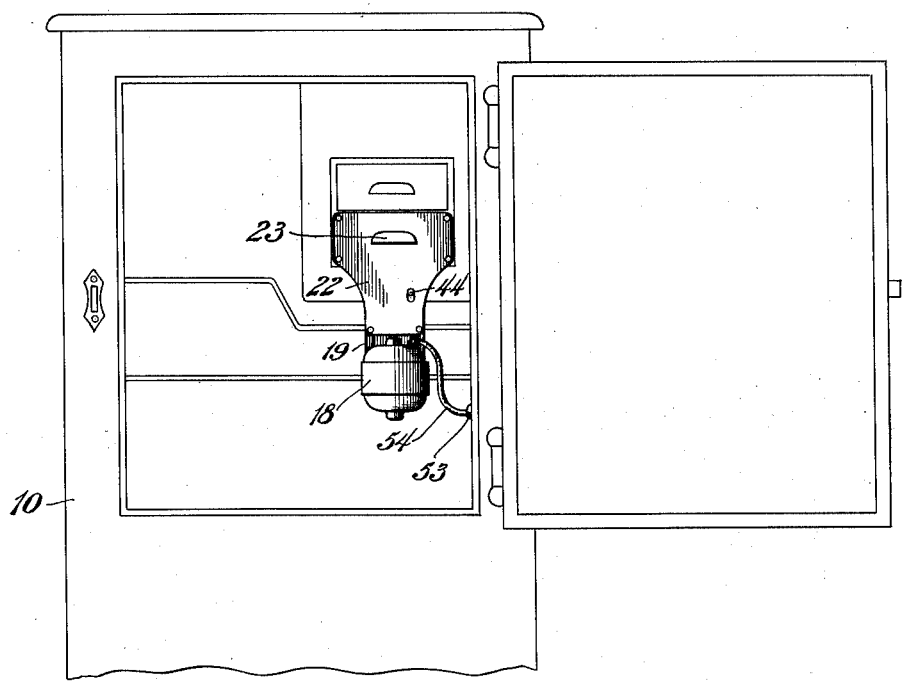
Fig. 1 is a front elevation of a refrigerator showing the preferred form of freezer therein.
Figure 2:
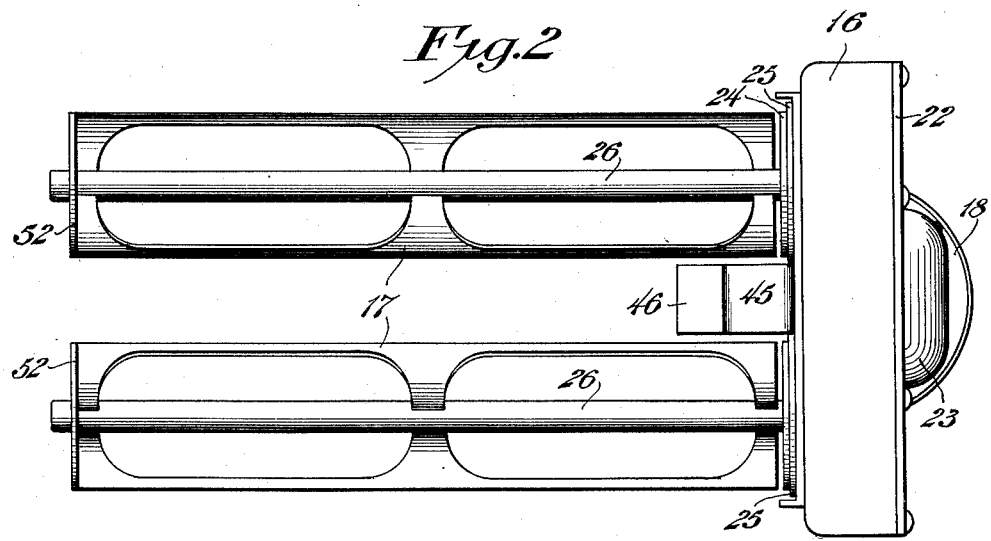
Fig. 2 is a top plan view of the freezer head carrying the operating mechanism including a pair of paddles.

It is a well known fact that ice cream cannot be made successfully in electric household refrigerators without some provision for stirring or agitating the cream. Heretofore, many attempts have been made to freeze cream in the ice making compartments, but the results have been unsatisfactory. In most instances the containers are removed periodically and the mixture is stirred by hand. This system or method is not only laborious but also does not produce smooth cream. This invention therefore aims to provide a relatively simple, economical automatic and compact freezing machine that can be inserted in an ice making compartment and ignored until time to serve the cream. In other words, the idea is to provide a modern, convenient, dependable and sanitary freezing machine to meet the demands of the modern housewife and save a great deal of labor.

Referring particularly to the drawings, the selected embodiment of the invention there shown in a refrigerator 10 includes a pair of freezing cans or cylinders 11 of relatively small capacity conveniently connected together by means of spaced frame members 12, so that the assembled cylinders will slide into and fit a standard size freezing compartment of the refrigerator after one of the ice pans is removed. It is anticipated, however, that a single freezing can of suitable shape may be substituted for the two cylindrical cans; but for mechanical reasons two parallel cylinders are preferred.

In the present example, the cylinders are made of suitable rust-proof sheet metal and have relatively thick end closures 13 in which suitable depressions 14 are formed to provide paddle shaft bearings. Also, a spring check or air vent valve 15 is inserted in each closure, (Fig. 8) so that frozen cream may be easily removed from the cylinders as will be hereinafter described. The open ends of the cylinders are machined so that they may be sealed by a working head 16 carrying a pair of paddles 17.

As best shown in Figs. 3, 4, 6 and 7, the working head is there shown as comprising a gear casing or housing adapted to be clamped tightly against the open ends of the cylinders and, in this instance, a small driving motor 18 is removably mounted on a bracket extension 19 of the housing. The arrangement is such that the head, including the operating mechanism and the paddles may be easily and quickly connected to and disconnected from the freezing cylinders. Further, the dimensions are such that the forwardly projecting or protruding parts have ample room in the available space in an ordinary electric or mechanical refrigerator.

In Figs. 6 and 8 the gear casing is shown as being made of a main casting preferably of aluminum or some other light rust-proof metal. This casting presents a relatively thick rear wall 20 having integral casing walls 21 to which a front cover plate 22 having a handle 23 is removably secured to afford access to the gearing. The rear face of the wall 20 is shown as having bosses 24 to fit in the ends of the cylinders and ring gaskets 25 are placed around the bosses to seal the ends of the cylinders. The paddle shafts 26 are journaled in stuffing boxes 27 in the rear wall and their forward ends extend into the gear casing.

Referring to Figs. 4, 6 and 8, worm wheels or gears 28 preferably made of hardwood or some suitable fiber to eliminate noise are suitably secured to the paddle shafts 26 and a short worm shaft 29 having a worm 30 meshing with both gears 28 is journaled in the casing. Referring to Fig. 6, an inwardly extending bearing bracket or ear 31 is shown as being cast integral with the rear wall 20, the worm shaft being journaled in and extending through this bracket at its lower end and being journaled at its upper end in a bearing opening in the upper wall of the casing.

In view of the fact that the cream will freeze so hard as to stall the motor or break some of the driving connections, it is highly desirable to make provision for stopping the motor automatically when the cream reaches a certain viscosity or hardness. To this end, the motor is so connected to the gearing that when the driving torque on the worm shaft exceeds a certain or predetermined amount, the connection is disabled and the motor is automatically stopped. In this example, a plunger type electric switch 32 is connected to control the motor circuit and is adapted to be actuated to open the circuit when the driving torque exceeds the predetermined limit.

Referring to Figs. 4 and 6, the motor shaft 33 is there shown as being connected to the worm shaft 29 by means of a shaft coupling 34 journaled near its lower end between a pair of bearing lugs 35 (Fig. 4). On the lower end of the worm shaft 29 is a head 36 having opposed spiral slots 37 constituting pairs of right hand threads and on the adjacent of the coupling shaft is a sleeve 38 having pins 39 working in the slots. The lower end of the coupling shaft is connected to the motor shaft by a sliding connection conveniently of the pin and slot type so that the coupling shaft can move downwardly when the sleeve 38 rotates on the head 36. Herein, the described clutch connection is effected by means of a compression spring 40 of a predetermined strength interposed between the lugs 35 and a switch actuating arm 41 below the sleeve 38, the arrangement being such that when the turning torque is sufficient to overcome the compression of the spring and cause the coupling shaft section to move downwardly, the switch arm 41 will move with the shaft and push the switch plunger 42 to open the circuit. This arm 41 is prevented from rotating with the shaft conveniently by means of a lug 43 projecting from the rear wall 20 which forms a square abutment for the rear end of the arm. An operating handle 44 on the switch plunger projects through a slot in the cover plate 22 so that the switch may be manually snapped into circuit closing position.

The working head may be clamped or assembled on the cylinders in a great many ways but I prefer to use a simple snap-action device in order to make it easy to operate. Herein, a U-shaped member presenting a pair of spring arms 45 is secured to the rear wall of the head and these arms present cam-shaped latch dogs 46 adapted to be pushed between the opposite sides of the frame 12 and snapped behind it between the cylinders. These spring latches must be sprung inwardly to release the head. Herein, there is shown a pivoted trigger arm 47 on a bracket between the cylinders and this arm is connected by a rod 48 to a cam member 49 so that when the trigger is raised (Fig. 6), the cams will press the spring arms inwardly. The forward end of the cam operating arm passes through a guide opening in a substantially V-shaped bracket 50 and is held retracted by means of a coil spring 51. It will be seen that the preferred latch mechanism does not present any projecting parts that can interfere with sliding the assembled cylinders into the ice making compartment or shoe.

To facilitate removal of the ice cream when the head is removed, a perforated, scavenging disk 52 is secured to each of the paddle shafts 26 so as to rest on the bottoms of the cylinders (Fig. 3). These disks are preferably large enough to fit loosely in the cylinders so that they assist in keeping the paddles centered and guide the ends of the shafts into their bearing depressions. The idea of providing the perforations (Fig. 5) is to permit the fluid cream mixture to flow through them when the paddles are being inserted. However, no frozen cream will flow through them as the paddles are removed. Air drawn in through the small ball check valves will permit easy withdrawal of the paddles and the cream.

It is now obvious that one or both of the cylinders may be filled with the desired mixture by standing them upright, the end frame member providing a stable base for this purpose. When the working head is snapped on, the whole device is inserted in the refrigerator as shown, although it may be put in any freezing compartment such as a box or can containing cracked ice and salt. In this example, a suitable electric plug or socket 53 is provided on the inside of the refrigerator so that the electric cable 54 for the motor may be quickly connected to it. Hence, the switch is closed and the refrigerator is closed and may remain closed until time to serve the ice cream.

From the foregoing description, it will be seen that the novel freezer is comparatively simple and compact. It has only two major parts to be assembled and dismantled when it is used. It is light and easy to handle. It is a complete automatic machine or unit that should be provided for every household refrigerator. There are no delicate operating parts that can easily get out of order. The automatic switch and other operating parts are enclosed so that they are not affected by any water of condensation and do not require any cleaning. The motor circuit can be plugged into any ordinary house wiring system so that there is practically no installation expense involved.

In short, it is believed that the invention will transform the making of small quantities of ice cream and ices from the realm of kitchen drudgery to a source of pleasure and satisfaction to the ultra-modern housewife.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. An ice cream freezer of the character described, comprising, in combination, a pair of freezing cylinders; a working head presenting gaskets sealing the ends of said cylinders; means to clamp the head on the cylinders; a pair of paddles carried by the head and having shafts journaled therein; worm gearing connected to drive said paddle shafts; a motor on the head connected to drive said worm gearing; and a housing within the working head for said driving connections.

2. An ice cream freezer of the character described, comprising, in combination, a pair of freezing cylinders; a working head removably connected to said cylinders; snap-action latch means for holding the working head on the cylinders; and a lever connected to release said latch means so that the head can be removed.

3. An ice cream freezer of the character described, comprising, in combination, spaced freezing cylinders; a working head removably secured to the open ends of said cylinders and carrying a pair of paddles; snap-action latch means extending between said cylinders and arranged to hold said working head assembled thereon; a cam device cooperating with said latches; and a lever for manipulating the cam so as to release the latches; said lever and its operating connections being arranged between the cylinders.

4. An ice cream freezer of the character described comprising, in comibnation, a pair of freezing cylinders; a working head removably connected to said cylinders and carrying a pair of paddles; means on the head to rotate the paddles; and scavenging disks arranged on the lower ends of the paddle shafts adapted to remove the frozen cream when the paddles are removed.

5. An ice cream freezer of the character described, comprising, in combination, a pair of freezing cylinders each having an air vent valve in its closed end; a working head removably secured to the open ends of the cylinders and carrying a pair of paddles; and perforated, scavenging disks secured to the ends of the paddle shafts to facilitate removal of the frozen cream from the cylinders, said vent valves permitting air to displace the cream as the working head is removed.

6. In an ice cream freezer of the character described, a freezing can; a working head secured to the can; a paddle projecting from the working head to the bottom of the can; and a perforated cream scavenging disk connected to the lower end of the paddle shaft.

7. An ice cream freezer of the character described comprising, in combination, a pair of freezing cylinders assembled to be inserted in a standard ice making compartment of an electric refrigerator; a working head having provision to be removably clamped on the open ends of said freezing cylinders and presenting a gear casing; a pair of paddle shafts journaled in said working head and projecting into the gear casing; stuffing boxes for the paddle shafts; worm wheels secured to the ends of the paddle shafts within the gear casing; a worm meshing with said worm wheel; and a motor connected to drive said worm.

8. An ice cream freezer of the character described comprising, in combination, a pair of freezing cylinders; a working head removably connected to the open ends of said cylinders; a gear casing on said working head; paddle shafts journaled in said working head and projecting into said gear casing; a pair of worm wheels connected to the paddle shafts; a worm for driving said worm wheels; a motor supported by said working head and having a shaft alined with the worm shaft; a slidable coupling shaft connecting the motor shaft to said worm shaft; a head having cam slots on the worm shaft; a sleeve on the coupling shaft having pins working in said slots; a spring of predetermined compression strength normally urging the coupling sleeve toward the worm so that the pins are seated in the cam slots; a switch adjacent to the coupling shaft; a switch operating arm carried by the coupling shaft and adapted to actuate the switch when the torque on the shaft is sufficient to overcome the compression of said spring and cause the coupling shaft to move toward the motor shaft.

9. An ice cream freezer of the character described comprising, in combination, a pair of freezing cylinders; a working head adapted to be clamped on the open ends of said cylinders; paddle shafts carried by the working head; a pair of worm wheels in the working head; a worm meshing with the worm wheels; a motor carried by the working head; a slidable shaft coupling connecting the motor shaft to the worm shaft; means associated with said shaft coupling to cause it to move axially in one direction when the torque on said shaft exceeds a predetermined maximum; a switch for the motor circuit having an operating plunger adjacent to said coupling shaft; and a switch actuating arm non-rotatably mounted on said coupling shaft arranged to open the motor circuit automatically when the cream has reached a predetermined hardness.

10. An ice cream freezer for domestic refrigerators comprising, in combination, a frame; a cream can in the frame constructed and arranged to be slid lengthwise into an ice making compartment of the refrigerator; a working head constituting a sealing closure for the can and carrying a paddle; a driving motor for the paddle; and a bracket on the head supporting the motor head when the freezer is inserted in the compartment.

11. An ice cream freezer for domestic refrigerators comprising, in combination, a rectangular frame; a cream can in the frame constructed and arranged to be slid lengthwise into an ice making compartment of the refrigerator; a working head providing a sealing closure detachably connected to the can and carrying a paddle; a depending extension integral with the working head; a motor mounted on the extension; and driving connections between the motor and the paddle.

12. An ice cream freezer for domestic refrigerators comprising, in combination, a supporting frame; a cream can in the frame constructed and arranged to be slid lengthwise into an ice making compartment of the refrigerator; a working head detachably connected to the can and carrying a paddle; a motor mounted on and supported below the working head; driving connections between the motor and the paddle; and torque responsive means in the driving connections automatically to disable the motor when the cream freezes to a predetermined consistency.

13. An ice cream freezer for domestic refrigerators comprising, in combination, a frame; a cream can in the frame constructed and arranged to be slid lengthwise into an ice making compartment of the refrigerator; a working head detachably connected to the can and carrying a paddle; a motor suspended from the working head; driving connections between the motor and the paddle; and a torque controlled electric switch in the head associated with the motor driving connections to open the motor circuit when the cream reaches a predetermined hardness.

14. An ice cream freezer for domestic refrigerators comprising, in combination, a pair of freezing cylinders; rectangular frame members supporting said cylinders and so shaped that the assembly may be inserted lengthwise in the freezing compartment of the refrigerator; a working head detachably connected to the open ends of both of the freezing cylinders; latch means to lock the working head in sealing engagement with the cylinders; a pair of paddles carried by the working head; and driving connections for the paddles housed within the working head.

15. An ice cream freezer for domestic refrigerators comprising, in combination, a frame; a pair of freezing cylinders in the frame adapted to be inserted lengthwise in the ice making compartment of the refrigerator; a working head sealed against and detachably connected to the open ends of both of said freezing cylinders; a motor carried by the working head; paddles mounted on the working head; and driving connections between the motor and the paddles.

In testimony, that I claim the foregoing as my own, I have hereto affixed my signature.

WILBUR D. CROSBY.